United States Patent [19]
Pietsch et al.

[11] Patent Number: 5,267,736
[45] Date of Patent: Dec. 7, 1993

[54] SEALING APPARATUS FOR ROTATING SHAFTS, IN PARTICULAR STERN TUBE SEAL FOR THE PROPELLER SHAFT OF A SHIP

[75] Inventors: Günter Pietsch, Hamburg; Ernst-Peter Von Bergen, Ahlefeld, both of Fed. Rep. of Germany

[73] Assignee: Blohm & Voss AG, Hamburg, Fed. Rep. of Germany

[21] Appl. No.: 888,772

[22] Filed: May 22, 1992

Related U.S. Application Data

[63] Continuation-in-part of Ser. No. 755,001, Sep. 5, 1991, Pat. No. 5,209,497.

Foreign Application Priority Data

Sep. 5, 1990 [DE] Fed. Rep. of Germany ....... 4028048
May 25, 1991 [DE] Fed. Rep. of Germany ....... 4117097

[51] Int. Cl.$^5$ .......................... F16J 15/46; F16J 15/34
[52] U.S. Cl. .......................................... 277/1; 277/3; 277/27; 277/28; 277/34; 277/58; 277/103
[58] Field of Search ............... 277/34, 34.3, 34.6, 277/3, 27, 103, 28, 1, 58

[56] References Cited

U.S. PATENT DOCUMENTS

| | | | |
|---|---|---|---|
| 2,300,385 | 10/1942 | Kollberg et al. | 277/3 |
| 2,719,737 | 10/1955 | Fletcher | |
| 2,752,175 | 6/1956 | Fletcher | 277/34 |
| 4,078,832 | 3/1978 | Wittman | 277/3 X |
| 4,632,403 | 12/1986 | Ishitani et al. | 277/27 |
| 5,209,497 | 5/1993 | Von Bergen et al. | 277/28 |

FOREIGN PATENT DOCUMENTS 2026628 2/1980 United Kingdom ............... 277/103

Primary Examiner—William A. Cuchlinski, Jr.
Assistant Examiner—James K. Folker
Attorney, Agent, or Firm—Nils H. Ljungman & Associates

[57] ABSTRACT

A sealing apparatus for rotating shafts, in particular a stern tube seal for a propeller shaft of a ship with or without shaft bushings, with aligned gaskets resting on the shaft and located in a stationary support system, preferably of an axial face seal, and with a backup seal located in the support system, which is designed as a gland seal with soft packings, and a gland which can be moved in the axial direction in a guide body connected to the support system, whereby between the guide body and the gland there is a cavity system, into which, when there is a failure of the main seal, a hydraulic or pneumatic pressure medium can be introduced, which activates the backup seal, is characterized by the fact that the cavity system consists of a number of individual piston-cylinder units uniformly distributed over a circle which is concentric with the shaft axis, corresponding to each of which there is a branch current of the hydraulic or pneumatic pressure medium.

20 Claims, 3 Drawing Sheets

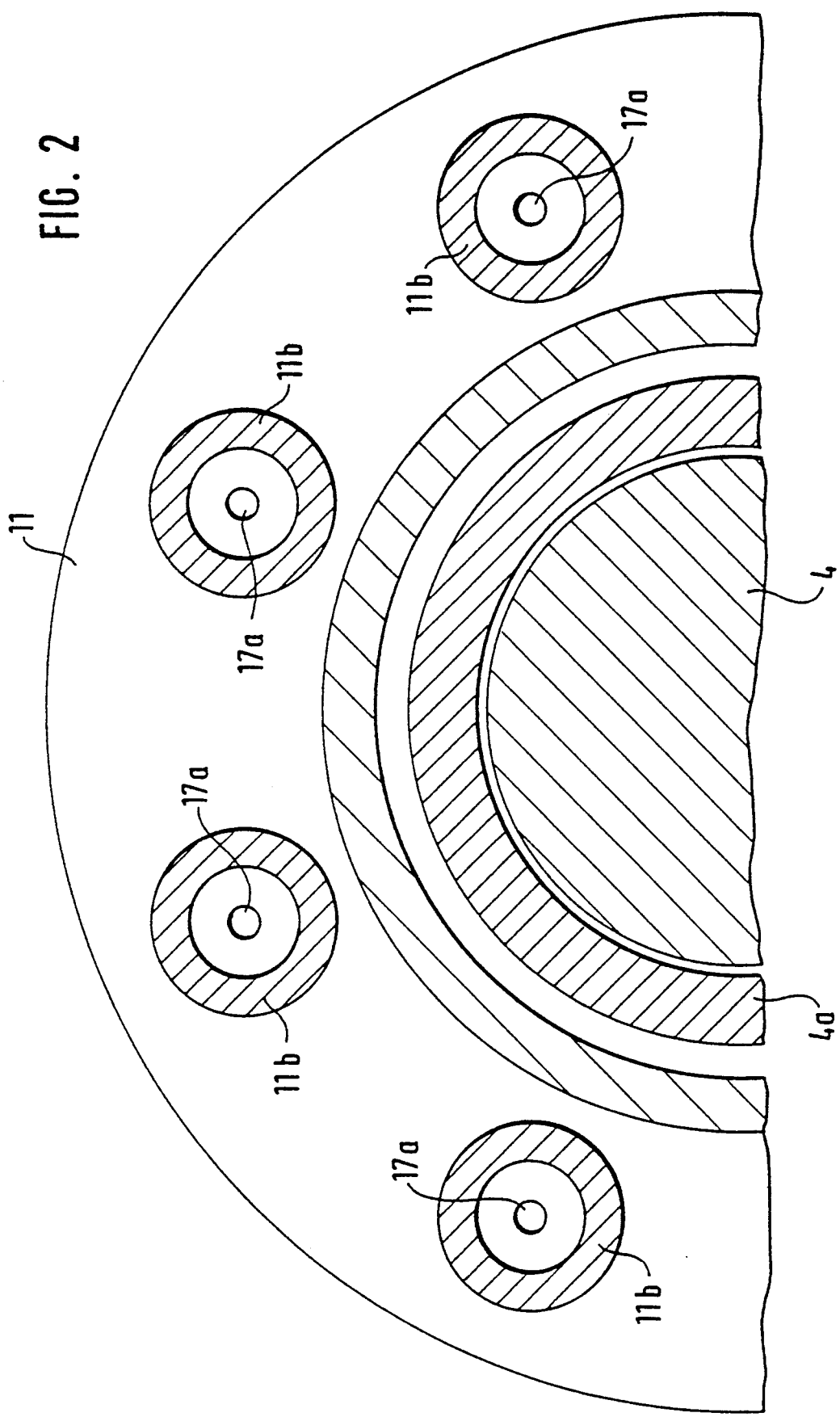

SEALING APPARATUS FOR ROTATING SHAFTS, IN PARTICULAR STERN TUBE SEAL FOR THE PROPELLER SHAFT OF A SHIP

This application is a continuation-in-part of U.S. patent application Ser. No. 07/755,001, entitled "Sealing Apparatus For Rotating Shafts, In Particular Stern Tube Seal For The Propeller Shafts Of A Ship," which was filed at the U.S. Patent and Trademark Office on Sep. 5, 1991 now U.S. Pat. No. 5,209,497.

BACKGROUND OF THE INVENTION

1. Field of the Invention

The present invention generally relates to a sealing apparatus for rotating shafts, in particular a stern tube seal for a propeller shaft of a ship, with or without shaft bushings, with aligned gaskets resting on the shaft and located in a stationary support system, preferably of an axial face seal, and with a backup seal located in the support system, which is designed as a gland seal with soft packings, and a gland which can be moved in the axial direction in a guide body connected to the support system, whereby between the guide body and the gland there is a cavity system into which, when there is a failure of the main seal, a hydraulic or pneumatic pressure medium can be introduced which activates the backup seal.

2. Background Information

In seals of the type described above, such as that disclosed by Federal Republic of Germany Published Patent Application No. P 40 28 048.9, the cavity system essentially consists of a single, ring-shaped inflatable body, which is inserted flush into an annular space between the guide body and the gland. German Published Patent Application No. P 40 28 048.9 corresponds to currently pending U.S. patent application Ser. No. 07/755,001, filed Sep. 5, 1991 now U.S. Pat. No. 5,209,497 from which the present application claims continuation-in-part status.

On such seals, there is generally a risk of the failure of the entire backup seal in the event of a leak in the single pressure body.

OBJECT OF THE INVENTION

An object of the present invention is to solve the problem described immediately above. This object is achieved in that the single pressure body is replaced by a number of individual pressure bodies, preferably uniformly distributed over a circle concentric with the shaft axis and, thus, the gland.

SUMMARY OF THE INVENTION

Generally, the individual pressure bodies are designed as individual piston-cylinder units, and there is a branch current of the hydraulic or pneumatic pressure medium corresponding to each of them.

As a result of this breaking up of the single pressure body into a number of independent pressure bodies, the function of the backup seal is essentially retained, even if one or the other of the individual pressure bodies develops a leak, e.g. as a result of the failure of the gasket between the piston and the cylinder of the piston-cylinder unit.

One aspect of the invention resides broadly in a stern tube seal for a rotating propeller shaft of a ship, the propeller shaft having an axial direction, the stern tube seal comprising: compressible sealing means for sealing around the propeller shaft; a gland member for being displaced in the axial direction for compressing and decompressing the compressible sealing means; means for guiding the displacement of the gland member in the axial direction; plural means for displacing the gland member in the axial direction, relative to the guiding means, for compressing and decompressing the compressible sealing means; each of the plural displacing means being disposed between a portion of the gland member and a portion of the guiding means; and each of said plural displacing means being configured to be activated by a pressurized medium.

BRIEF DESCRIPTION OF THE DRAWINGS

The accompanying drawings illustrate the object of the present invention in the form of an embodiment, wherein:

FIG. 2 shows a cross section taken along the line A—A in FIG. 1.

DESCRIPTION OF THE PREFERRED EMBODIMENT

Figure 1:
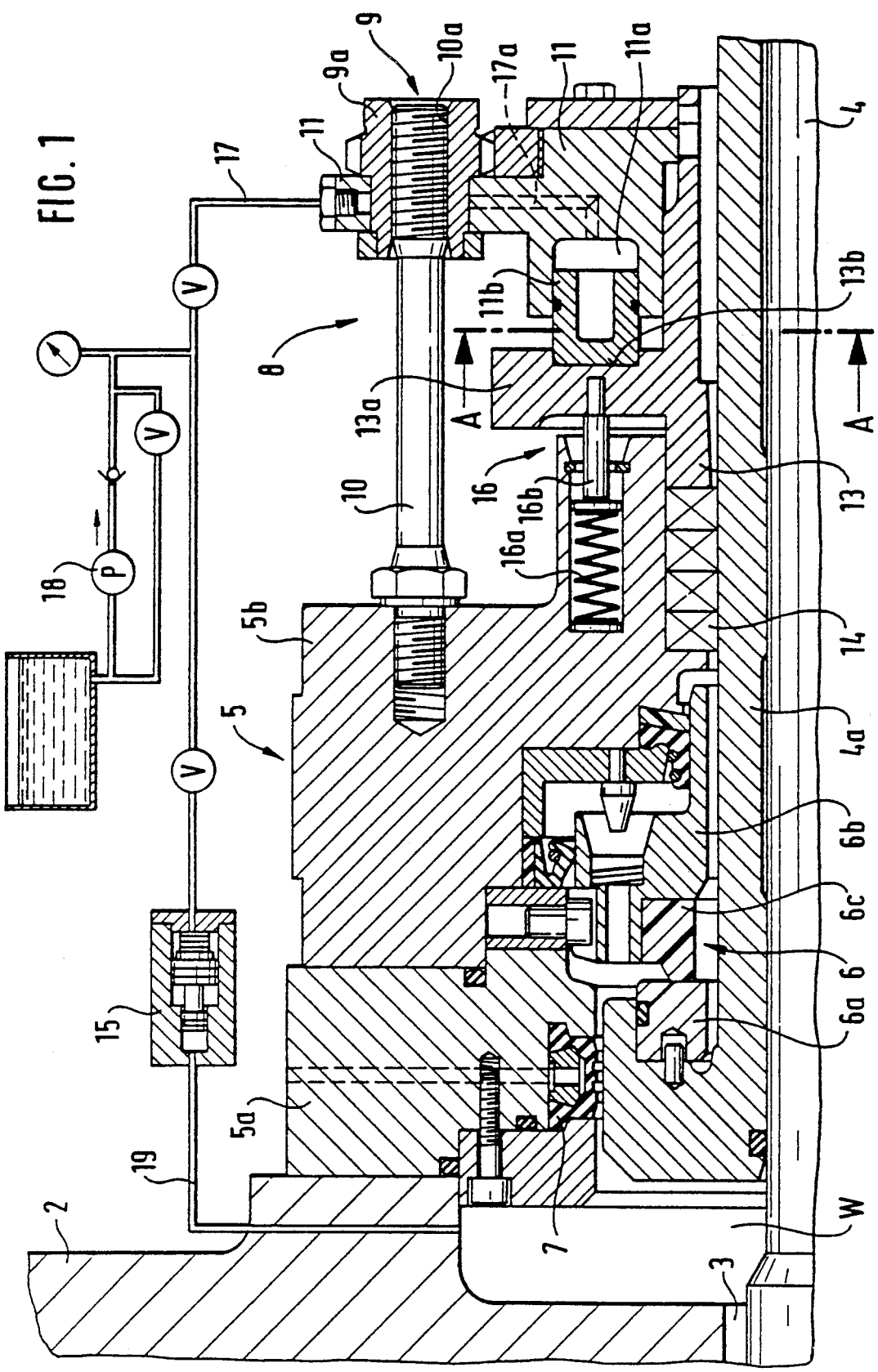
FIG. 1 shows a sealing device according to the present invention, in longitudinal section.
Figure 1A:
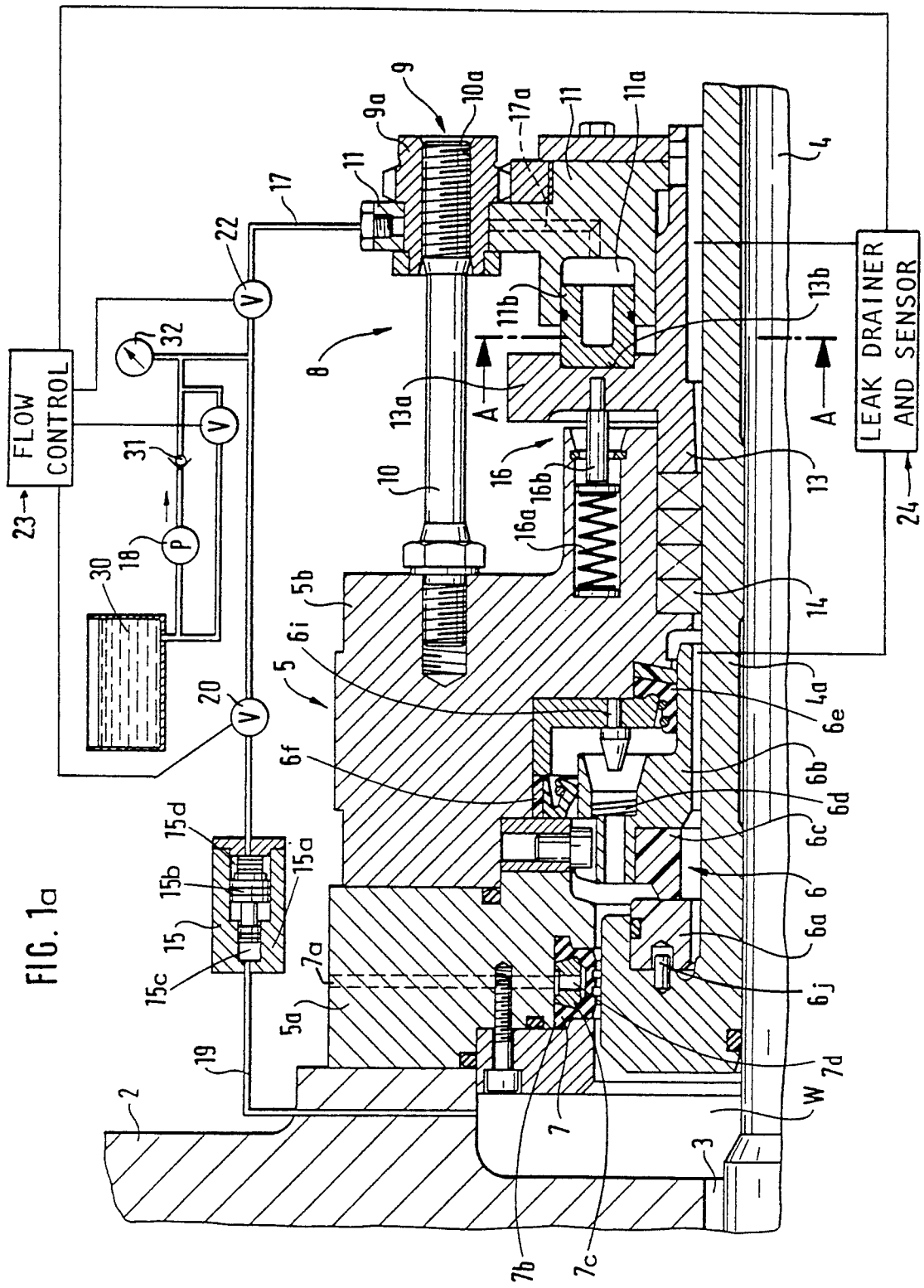
FIG. 1a is essentially the same view as FIG. 1, but showing additional components.

As shown in FIGS. 1 and 1a, the outside skin, or outer skin, of a hull 2 of a ship has a hole 3 for the introduction, or passage, of the propeller shaft 4 of the ship leading from the engine to the propeller, on which propeller shaft 4 a bushing 4a is installed, or pulled.

To seal the propeller shaft 4 or the bushing 4a against the outside water W, there is a sealing device, or sealing arrangement 5 with a multi-part support system 5a, 5b fastened to the outer skin 2, which support system includes a main seal 6 and a backup seal 8.

The main seal 6 is designed as an axial face seal, or rotating mechanical seal, and is accordingly equipped in conventional fashion with a seal ring, or axial seal, 6c braced between a ring 6a connected to the bushing 4a and a packing ring, or clamping ring, 6b connected to the support system. In addition, in the illustrated embodiment, the main seal 6 is equipped with an expandable, or inflatable, static auxiliary seal 7, which can be activated by a pressure medium as necessary.

FIG. 1a shows main seal 6 in which packing ring 6b is braced against seal ring, or axial seal, 6c by spring 6d, and leakage around packing ring 6b is prevented by sealing elements 6e and 6f. Spring pin 6i supports spring 6d. Pin, 6g not shown secures packing ring 6b, and pin 6g may be adapted to prevent rotation of seal ring, or axial seal, 6c. Insert 6h now shown supports seal element 6e, seal element 6f, and spring support pin 6i. Pin 6j supports ring 6a on bushing 4a. In addition, FIG. 1a shows auxiliary seal 7 having pressure tube 7a for introducing a pressure medium. Seal elements 7 b–d are activated by the pressure medium to seal against bushing 4a.

In the event of a failure of the main seal 6, the backup seal 8 acts as an emergency seal, and is designed as a gland seal with a gland 13 and with soft packings 14. The gland 13 can be moved axially in relation to a ring-shaped guide body 11, which is rigidly connected to the support system 5a, 5b by means of a spacer 10.

In accordance with the present invention, the gland 13 is preferably provided with an external ring flange 13a. External ring flange 13a preferably has a number of cylindrical recesses 13b therein, which are preferably uniformly distributed over a circle. In a preferred embodiment of the present invention, there are preferably eight such cylindrical recesses 13b. The guide body 11 is preferably equipped with a corresponding number, i.e. eight in the present case, of pistons 11b inserted in cylindrical recesses 11a, wherein pistons 11b interact with the recesses 13b in the manner of piston-cylinder units.

In each of the cylinder chambers of these piston-cylinder units, a branch line 17a of a pressure line 17 is preferably provided, the pressure line 17 being connected to a pressure source 18 supplying a hydraulic or pneumatic pressure medium. The pressure source 18 may be a hydraulic pump or a pneumatic pump.

FIG. 1a shows a reservoir 30 which may contain hydraulic fluid, check-valve 31 which prevents flow of the pressure medium towards the pressure source 18, and gauge 32 for measuring the pressure in the pressure tube system.

The pressure line 17 is also connected to a pressure line 19, which empties into the outside water W and in which there is a pressure control mechanism 15, which acts so that when the pressure of the outside water W increases, the pressure of the pressure medium increases accordingly, and when the pressure of the outside water W decreases, the pressure of the pressure medium decreases. As shown in FIG. 1a, pressure control mechanism 15 may be a piston cylinder arrangement having piston 15b and cylinder 15a. Pressure line 19 communicates with chamber 15c on one side of piston 15b, and pressure line 17 communicates with chamber 15d on the other side of piston 15b. Thus, when the pressure of the water W varies, the piston 15b will shift and change the pressure in the pressure line 17 accordingly.

As also shown in FIG. 1a, valves 20, 21, 22 are used to control the pressure of the pressurized medium in pressure line 17. Flow control 23 controls valves 20, 21, 22. Leak drainer and sensor 24 functions to drain outside water W which may leak around main seal 6. When a predetermined maximum leakage occurs, then leak drainer and sensor 24 will activate flow control 23 to increase the pressure of the pressurized medium in pressure line 17. The leak drainer and sensor 24 may comprise tubes which drain away outside water W which has leaked past the main seal 6 and flow meters within the tubes which sense the leakage rate. Alternatively, the leak drainer and sensor 24 may sense leaking water W in the vicinity of bushing 4a. Upon sensing the water W the leak drainer and sensor 24 would then activate flow control 23 to increase the pressure of the pressurized medium in pressure line 17, thus activating the backup seal 8. In addition, a drainage system such as a pump and tubing would be activated to remove the water W which had leaked around main seal 6.

Between the support system 5a, 5b and the ring-shaped flange 13a of the gland 13, there is also a restoring device, or return apparatus, 16, which preferably consists at least of a coil spring 16a and a tappet 16b interacting therewith, whereby the coil spring 16a is mounted in the support system 5a, 5b, and the tappet 16b is connected with its free end to the ring-shaped flange 13a. The restoring force, or return force, of the coil spring 16a is designed so that when the pressure of the pressure medium decreases, the gland 13 moves in the release direction, or into the release position, and thus relieves, or reduces the load on, its soft packings 14.

There is also an actuator, or regulating device, 9, which is interposed between the guide body 11 and the spacer 10, and which consists of a threaded nut 9a which is mounted so that it can rotate in a recess in the guide body 11, but cannot be displaced axially, and which interacts by means, of a threaded portion 10a with the spacer 10.

This actuator, which can be activated manually, is used on one hand to provide protection in the event of a leak in the inflatable body or a failure of the pressure source, and on the other hand as an adjustment apparatus for the base position of the entire backup seal system.

One feature of the invention resides broadly in a sealing apparatus for rotating shafts, in particular stern tube seal for a propeller shaft of a ship with or without shaft bushings, with aligned gaskets resting on the shaft and located in a stationary support system, preferably of an axial face seal, and with a backup seal located in the support system, which is designed as a gland seal with soft packings, and a gland which can be moved in the axial direction in a guide body connected to the support system, whereby between the guide body and the gland there is a cavity system into which, when there is a failure of the main seal, a hydraulic or pneumatic pressure medium can be introduced which activates the backup seal, characterized by the fact that the cavity system consists of a number of individual piston-cylinder units uniformly distributed over a circle which is concentric with the shaft axis, corresponding to each of which there is a branch current of the hydraulic or pneumatic pressure medium.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A stern tube seal for a rotating propeller shaft of a ship, the propeller shaft having an axial direction, said stern tube seal comprising:
   compressible sealing means for sealing around the propeller shaft;
   a gland member for being displaced in the axial direction for compressing and decompressing said compressible sealing means, to vary sealing;
   means for guiding the displacement of said gland member in the axial direction;
   plural means for displacing said gland member in the axial direction, relative to said guiding means, for compressing and decompressing said compressible sealing means;

each of said plural displacing means being disposed between a portion of said gland member and a portion of said guiding means; and each of said plural displacing means being configured to be activated by a pressurized medium.

2. The stern tube seal of claim 1, wherein said plural displacing means comprises a plurality of piston-cylinder units disposed about the propeller shaft.

3. The stern tube seal of claim 2, wherein said plurality of piston-cylinder units are distributed generally uniformly about the propeller shaft.

4. The stern tube seal of claim 3, further comprising a pressure line for conducting the pressurized medium to said piston-cylinder units, said pressure line for being connected with each of said piston-cylinder units.

5. The stern tube seal of claim 4, further comprising pressure control means being connected between said pressure line and a medium to be sealed out, said pressure control means being configured for varying the pressure of the pressurized medium in direct relation to the pressure of the medium to be sealed out.

6. The stern tube seal of claim 5, wherein the pressurized medium comprises one of:

a hydraulic pressure medium, the hydraulic pressure medium being separate from the medium to be sealed out; and a pneumatic pressure medium.

7. The stern tube seal of claim 6, comprising:

a support body including a portion of the stern tube seal;

said guide body having a flange-shaped extension; and connecting means being connected between said flange-shaped extension and said support body, said connecting means additionally for moving said guide means and said gland member in an axial direction.

8. The stern tube seal of claim 7, further comprising:

elastic restoring means for moving said gland member in an axial direction to decompress said compressible sealing means when at least one of:

the pressure of the pressurized medium is decreased; and said connecting means moves said guide means to decompress said compressible sealing means;

said compressible sealing means comprising a plurality of soft packings;

said soft packings being deformable in response to axial movement of said gland member;

said soft packings for being aligned with one another, and for being disposed adjacent and against one another, along an axial direction of the propeller shaft;

said soft packings for being disposed about the propeller shaft;

one of said soft packings being configured for contacting said gland member;

said soft packings being disposed within said support body;

said flange-shaped extension having a recess, said recess being connected to said connecting means;

said connecting means comprising a threaded bolt member being connected between said recess of said flange-shaped extension and said support body, said threaded bolt member being axially-parallel to the propeller shaft, and said connecting means comprising a threaded nut cooperating with said threaded bolt member and said recess, said threaded nut being for connecting said threaded bolt member to said flange-shaped extension and for moving said guide means and said gland member in an axial direction;

said elastic restoring means connecting between said gland member and said support body;

said elastic restoring means comprising a spring member and a tappet member, said spring member being connected with said tappet to bias said tappet;

said threaded bolt member being separate from said tappet member;

said threaded bolt member being configured for holding said guide member in a fixed relationship with respect to said support body;

said gland member being configured for fitting into said guide member to form a greater piston-cylinder unit;

a portion of said gland member being configured to telescope into said guide member to form said piston-cylinder unit;

the propeller shaft comprising a bushing;

said pressure control means comprising a piston-cylinder arrangement;

said piston-cylinder arrangement comprising a piston and a cylinder, said cylinder being divided into a first chamber and a second chamber by said piston, said first chamber being disposed towards one end of said cylinder and said second chamber being disposed towards another end of said cylinder;

said pressure line being a main pressure line;

said main pressure line extending from said first chamber of said piston, and communicating between said first chamber of said piston and said plurality of piston-cylinder units;

a feeder line extending from the medium to be sealed out to said piston-cylinder arrangement, said feeder line communicating between the medium to be sealed out and said second chamber of said piston;

said stern tube seal further comprising:

a plurality of branch pressure lines being connected between said main pressure line and said plurality of piston-cylinder units, each of said plurality of branch pressure lines being connected with a corresponding one of said piston-cylinder units for conducting the pressurized medium to the corresponding one of said piston-cylinder units;

said piston-cylinder units being disposed in a circle about the propeller shaft, the circle being concentric with the propeller shaft;

said guiding means comprising a guide body being rigidly connected to said support body by means of said threaded bolt member;

a pressure source for providing the pressurized medium to said piston-cylinder units, said pressure source being one of a hydraulic pump and a pneumatic pump;

said gland comprising an external ring flange;

said external ring flange comprising a plurality of cylindrical recesses;

said plurality of cylindrical recesses of said external ring flange being eight cylindrical recesses;

said plurality of cylindrical recesses being uniformly distributed, in a circle, about the propeller shaft;

said guide body comprising a plurality of additional cylindrical recesses and a plurality of pistons disposed within said additional cylindrical recesses, each of said pistons being slidably disposed within a corresponding one of said additional cylindrical recesses of said guide body;

said plurality of additional cylindrical recesses of said guide body being eight cylindrical recess and said plurality of pistons being eight pistons;

said piston-cylinder units comprising said cylindrical recesses of said external ring flange, additional said cylindrical recesses of said guide body and said pistons;

each of said pistons being configured to slidably displace into a corresponding one of said cylindrical recesses of said external ring flange;

each of said pistons having a general cup shape;

the pressurized medium being hydraulic fluid;

a reservoir for containing the hydraulic fluid;

check valve means for preventing the flow of hydraulic fluid towards said pressure source;

gauge means for measuring the pressure of the hydraulic fluid;

a second pressure line being connected to empty into the medium to be sealed out, said second pressure line being connected to said main pressure line;

said pressure control means being disposed along said second pressure line; and valve means for controlling the pressure of the pressurized medium in said main pressure line.

9. A stern tube seal for a rotating propeller shaft of a ship, the propeller shaft having an axial direction, said stern tube seal comprising:

a first seal for functioning as a main seal; and a backup seal, said backup seal comprising:

compressible sealing means for sealing around the propeller shaft;

a gland member for being displaced in the axial direction for compressing and decompressing said compressible sealing means, to vary sealing;

means for guiding the displacement of said gland member in the axial direction;

plural means for displacing said gland member in the axial direction, relative to said guiding means, for compressing and decompressing said compressible sealing means;

each of said plural displacing means being disposed between a portion of said gland member and a portion of said guiding means; and each of said plural displacing means being configured to be activated by a pressurized medium.

10. The stern tube seal of claim 9, wherein said plural displacing means comprises a plurality of piston-cylinder units disposed about the propeller shaft.

11. The stern tube seal of claim 10, wherein said plurality of piston-cylinder units are distributed generally uniformly about the propeller shaft.

12. The stern tube seal of claim 11, further comprising a pressure line for conducting the pressurized medium to said piston-cylinder units, said pressure line for being connected with each of said piston-cylinder units.

13. The stern tube seal of claim 12, further comprising pressure control means being connected between said pressure line and a medium to be sealed out, said pressure control means being configured for varying the pressure of the pressurized medium in direct relation to the pressure of the medium to be sealed out.

14. The stern tube seal of claim 13, wherein the pressurized medium comprises one of:

a hydraulic pressure medium, the hydraulic pressure medium being separate from the medium to be sealed out; and a pneumatic pressure medium.

15. The stern tube seal of claim 14, comprising:

a support body including a portion of the stern tube seal;

said guide body having a flange-shaped extension; and connecting means being connected between said flange-shaped extension and said support body, said connecting means additionally for moving said guide means and said gland member in an axial direction.

16. The stern tube seal of claim 15, comprising elastic restoring means for moving said gland in an axial direction to decompress said compressible sealing means when at least one of:

the pressure of the pressurized medium is decreased; and said connecting means moves said guide means to decompress said compressible sealing means.

17. The stern tube seal of claim 16, wherein said backup seal is located at one of:

in front of said main seal in relation to the medium to be sealed out; and behind said main seal in relation to the medium to be sealed out.

18. The stern tube seal of claim 17, wherein said backup seal is located in front of said main seal in relation to the medium to be sealed out, and said backup seal is configured to be activated when the propeller shaft is not moving.

19. The stern tube seal of claim 20, wherein the propeller shaft comprises a bushing, said stern tube seal further comprising:

said pressure control means comprising a piston-cylinder arrangement;

said flange-shaped extension having a recess, said recess being connected to said connecting means;

said connecting means comprising a threaded bolt member being connected between said recess of said flange-shaped extension and said support body, said threaded bolt member being axially-parallel to the propeller shaft, and said connecting means comprising a threaded nut cooperating with said threaded bolt member and said recess, said threaded nut being for connecting said threaded bolt member to said flange-shaped extension and for moving said guide means and said gland member in an axial direction;

said elastic restoring means connecting between said gland member and said support body;

said elastic restoring means comprising a spring member and a tappet member, said spring member being connected with said tappet member to bias said tappet member;

said threaded bolt member being separate from said tappet member;

said threaded bolt member being configured for holding said guide member in a fixed relationship with respect to said support body;

said gland member being configured for fitting into said guide member to form a greater piston-cylinder unit;

a portion of said gland member being configured to telescope into said guide member to form said piston-cylinder unit;

said piston-cylinder arrangement comprising a piston and a cylinder, said cylinder being divided into a first chamber and a second chamber by said piston, said first chamber being disposed towards one end of said cylinder and said second chamber being disposed towards another end of said cylinder;

said pressure line being a main pressure line;

said main pressure line extending from said first chamber of said piston, and communicating between said first chamber of said piston and said plurality of piston-cylinder units;

a feeder line extending from the medium to be sealed out to said piston-cylinder arrangement, said feeder line communicating between the medium to be sealed out and said second chamber of said piston;

said main seal comprising a rotating mechanical seal;

said main seal further comprising:
  a seal ring for sealing out the medium to be sealed out;
  a ring connected to the bushing for rotating with the bushing;
  a clamping ring connected to said support body;
  said ring connected to the bushing and said clamping ring for bracing said seal ring therebetween, for sealing between said seal ring and each of said clamping ring and said ring connected to the bushing;
  a first seal spring for biasing said seal ring between said ring connected to the bushing and said clamping ring, said first seal spring being connected between said clamping ring and said support body;
  a first seal pin for connecting said clamping ring to said support body, said pin being configured to prevent rotation of said clamping ring and to permit movement of said clamping ring in the axial direction;
  a plurality of clamping ring seals for sealing between said clamping ring and said support body;

said backup seal further comprising:
  said compressible sealing means comprising a plurality of soft packings;
  said soft packings being deformable in response to axial movement of said gland member;
  said soft packings for being aligned with one another, and for being disposed adjacent and against one another, along an axial direction of the propeller shaft;
  said soft packings for being disposed about the propeller shaft;
  one of said soft packings being configured for contacting said gland member;
  said soft packings being disposed within said support body;
  a plurality of branch pressure lines being connected between said main pressure line and said plurality of piston-cylinder units, each of said plurality of branch pressure lines being connected with a corresponding one of said piston-cylinder units for conducting the pressurized medium to the corresponding one of said piston-cylinder units;
  said piston-cylinder units being disposed in a circle about the propeller shaft, the circle being concentric with the propeller shaft;
  said guiding means being a guide body and being rigidly connected to said support body by means of said threaded bolt member;

a pressure source for providing the pressurized medium to said piston-cylinder units, said pressure source being one of a hydraulic pump and a pneumatic pump;

said gland comprising an external ring flange;

said external ring flange comprising a plurality of cylindrical recesses;

said plurality of cylindrical recesses of said external ring flange being eight cylindrical recesses;

said plurality of cylindrical recesses being uniformly distributed, in a circle, about the propeller shaft;

said guide body comprising a plurality of additional cylindrical recesses and a plurality of pistons disposed within said additional cylindrical recesses, each of said pistons being slidably disposed within a corresponding one of said additional cylindrical recesses of said guide body;

said plurality of additional cylindrical recesses of said guide body being eight cylindrical recesses and said plurality of pistons being eight pistons;

said piston-cylinder units comprising said cylindrical recesses of said external ring flange, said additional cylindrical recesses of said guide body and said pistons;

each of said pistons being configured to slidably displace into a corresponding one of said cylindrical recesses of said external ring flange; and each of said pistons having a general cup shape;

the pressurized medium being hydraulic fluid;

a reservoir for containing the hydraulic fluid;

check valve means for preventing the flow of hydraulic fluid towards said pressure source;

gauge means for measuring the pressure of the hydraulic fluid;

a second pressure line being connected to empty into the medium to be sealed out, said second pressure line being connected to said main pressure line;

said pressure control means being disposed along said second pressure line;

valve means for controlling the pressure of the pressurized medium in said main pressure line;

automatic flow control means for activating the pressurized medium;

means for sensing and draining leaks, the leaks being of the medium to be sealed out when the medium to be sealed out has penetrated the main seal, said means for sensing and draining leaks being configured for activating said automatic flow control means to increase the pressure of the pressurized medium when a predetermined maximum leakage occurs;

an auxiliary seal for sealing around the propeller shaft, said auxiliary seal being between the medium to be sealed out and both said first seal and said backup seal;

said auxiliary seal being configured to be activated by a pressurized medium; and said auxiliary seal being inflatable.

20. A method of operating a stern tube seal for a rotating propeller shaft of a ship, the propeller shaft having an axial direction, the stern tube seal comprising: a first seal for functioning as a main seal; and a backup seal, the backup seal comprising: compressible sealing means for sealing around the propeller shaft, a gland member for being displaced in the axial direction for compressing and decompressing the compressible sealing means to vary sealing, means for guiding the displacement of the gland member in the axial direction, plural means for displacing the gland member in the axial direction, relative to the guiding means, for compressing and decompressing said compressible sealing means, each of the plural displacing means being disposed between a portion of the gland member and a portion of the guiding means, and each of the plural displacing means being configured to be activated by a pressurized medium; said method comprising the steps of:

providing a first seal for functioning as a main seal;

providing a backup seal and, for the backup seal, providing:

the compressible sealing means for sealing around the propeller shaft;

the gland member for being displaced in the axial direction for compressing and decompressing the compressible sealing means to vary sealing;

the means for guiding the displacement of the gland member in the axial direction;

the plural means for displacing the gland member in the axial direction, relative to the guiding means, for compressing and decompressing the compressible sealing means, each of the plural displacing means being disposed between a portion of the gland member and a portion of the guiding means and each of the plural displacing means being configured to be activated by the pressurized medium;

said method comprising the further steps of:

sealing the propeller shaft with the first seal;

operating the backup seal by:

sealing the backup seal around the propeller shaft by means of the compressible sealing means;

displacing the gland member in the axial direction for compressing and decompressing the compressible sealing means to vary sealing;

guiding, by means of the guiding means, the displacement of the gland member in the axial direction;

displacing, by means of the plural displacing means, the gland member in the axial direction, relative to the guiding means, for compressing and decompressing the compressible sealing means;

disposing each of the plural displacing means between a portion of the gland member and a portion of the guiding means;

configuring each of the plural displacing means to be activated by a pressurized medium; and activating each of the plural displacing means by means of the pressurized medium.

* * * * *

UNITED STATES PATENT AND TRADEMARK OFFICE
CERTIFICATE OF CORRECTION

PATENT NO. : 5,267,736
DATED : December 7, 1993
INVENTOR(S) : Gunter PIETSCH and Ernst-Peter VON BERGEN It is certified that error appears in the above-indentified patent and that said Letters Patent is hereby corrected as shown below:

Title page item 54, in the Title, after 'PROPELLER' delete "SHAFT" and insert --SHAFTS--.

In addition, in column 1, in the title, after 'PROPELLER' delete "SHAFT" and insert --SHAFTS--.

In column 7, line 4, Claim 8, after 'cylindrical' delete "recess" and insert --recesses--.

In column 10, line 39, Claim 19, after 'control' delete "means" and insert --mechanism--.

Signed and Sealed this

Third Day of September, 1996

Attest:

BRUCE LEHMAN

*Attesting Officer*     *Commissioner of Patents and Trademarks*